June 7, 1966 R. W. SHOUP ETAL 3,254,596
DOCUMENT PRINTING DEVICE
Filed May 20, 1964 9 Sheets-Sheet 9
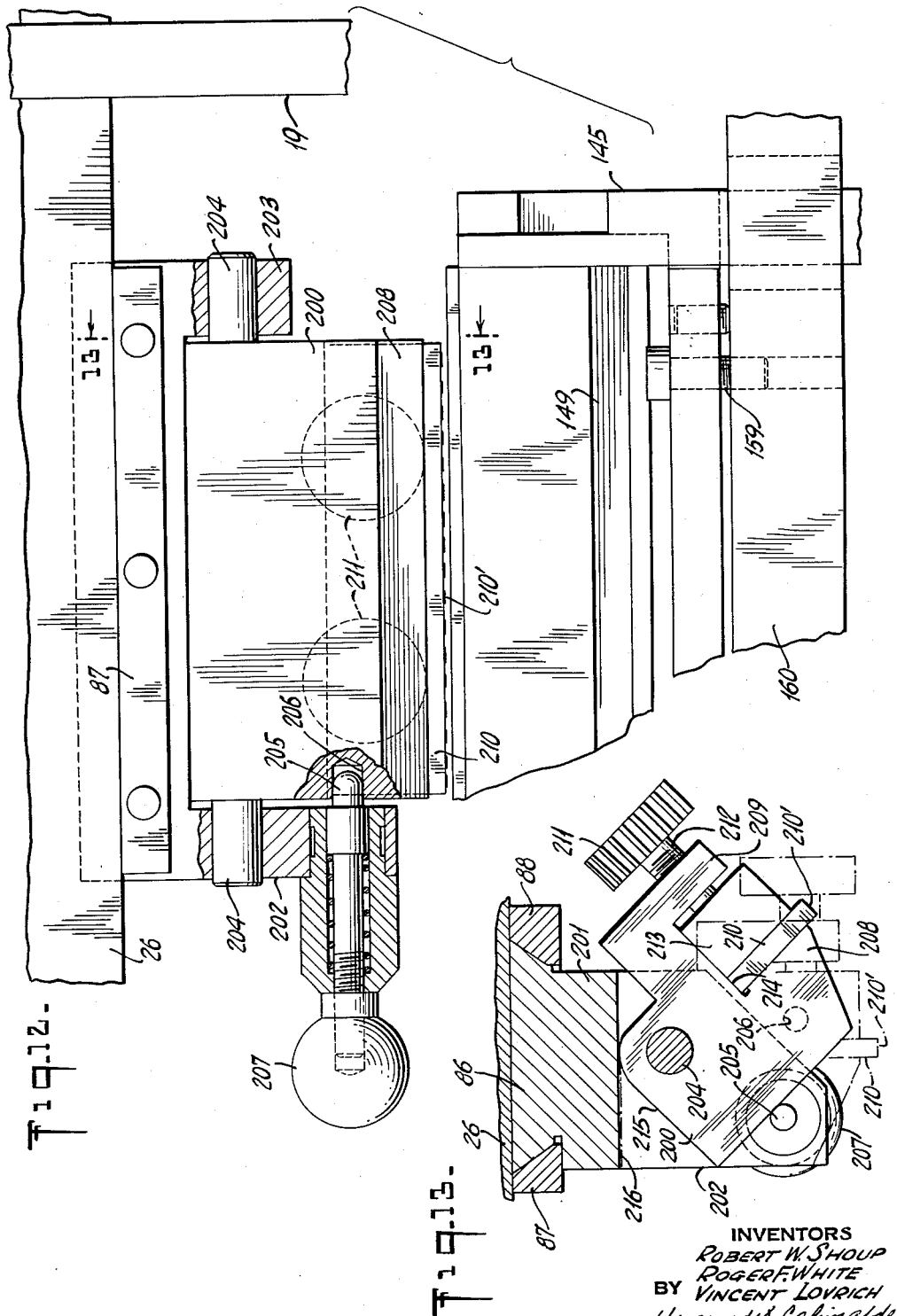
INVENTORS
ROBERT W. SHOUP
ROGER F. WHITE
VINCENT LOVRICH
BY
Hopgood & Calimafde
ATTORNEYS

# United States Patent Office 3,254,596
Patented June 7, 1966

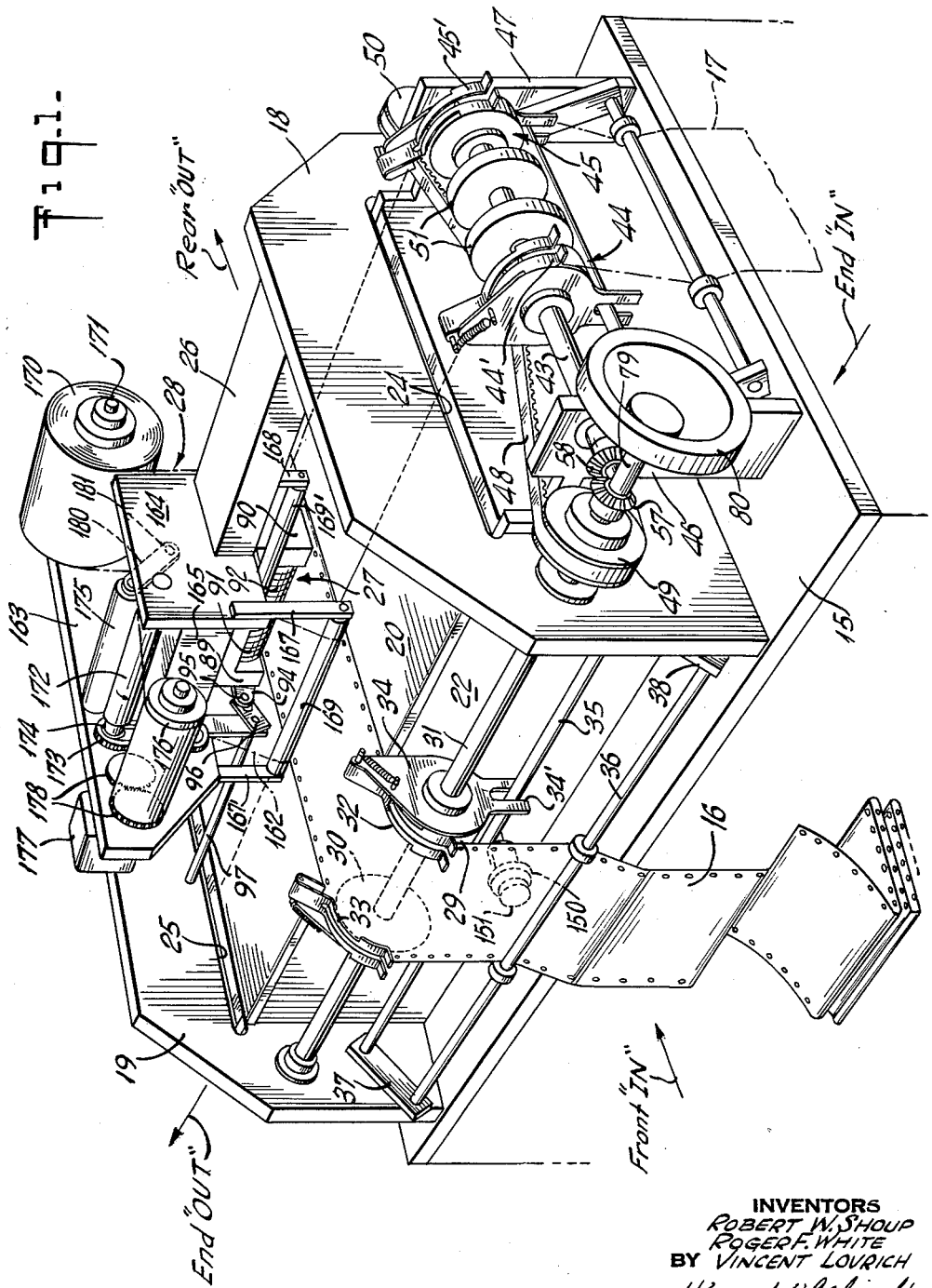

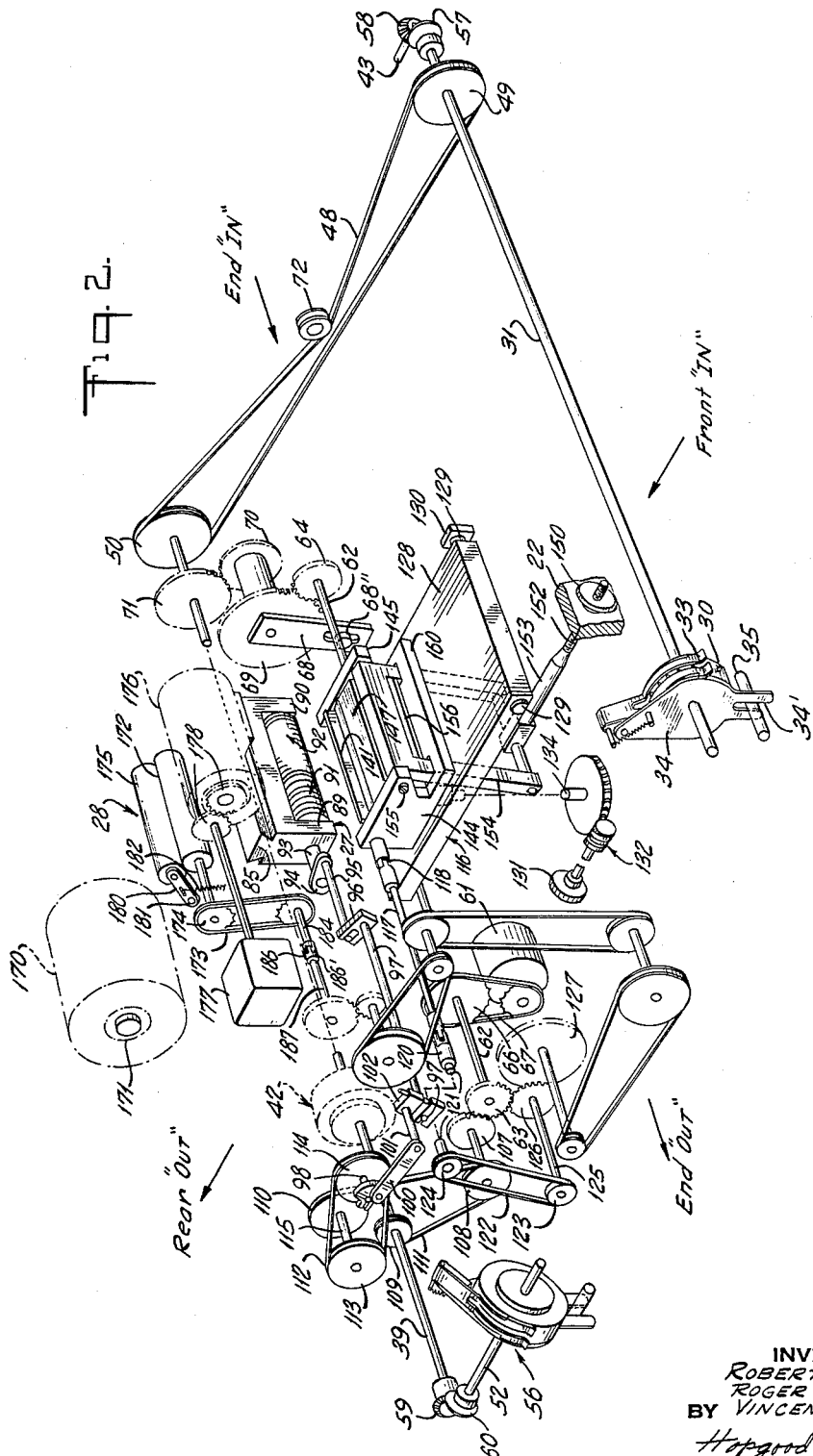

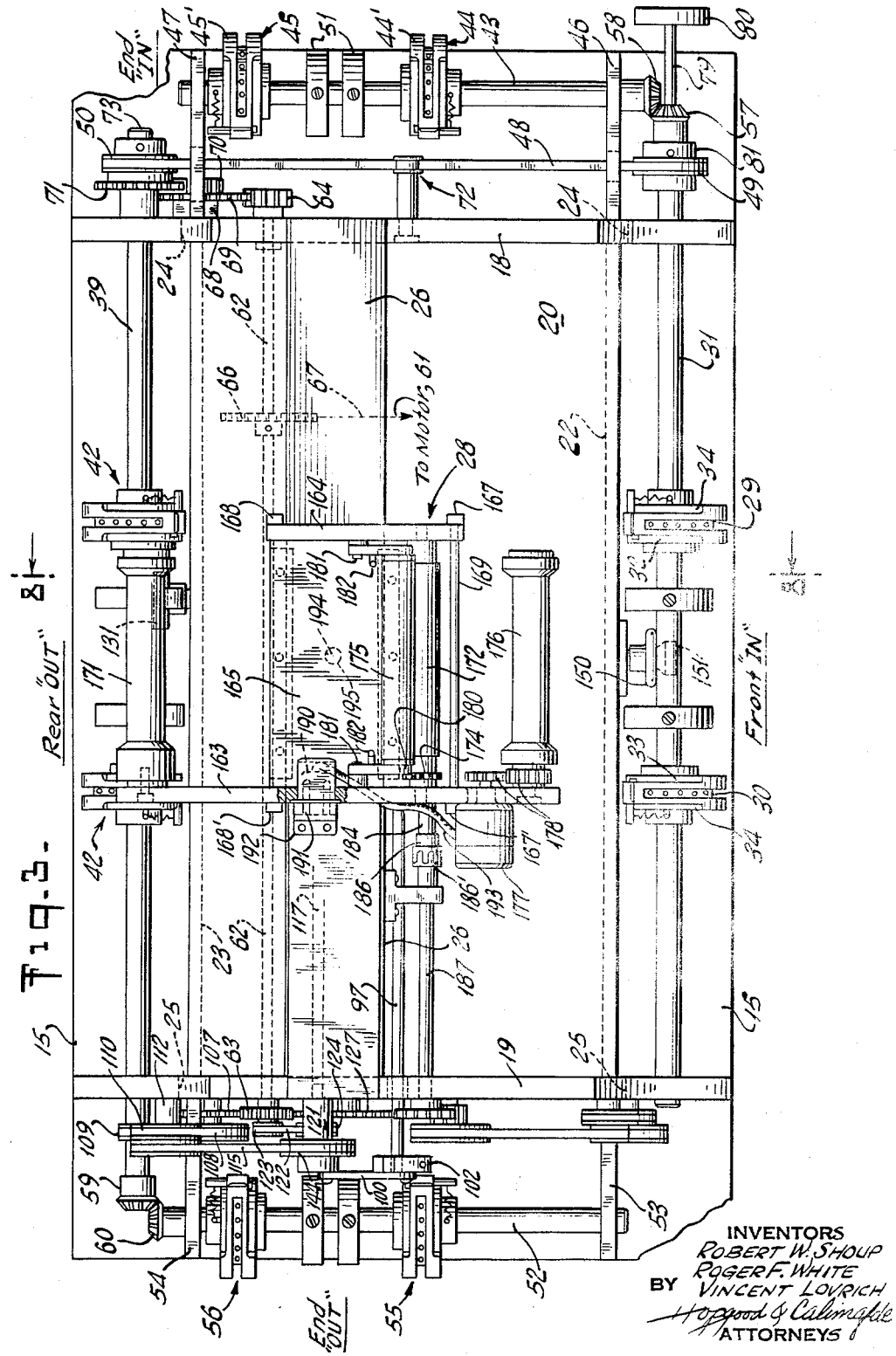

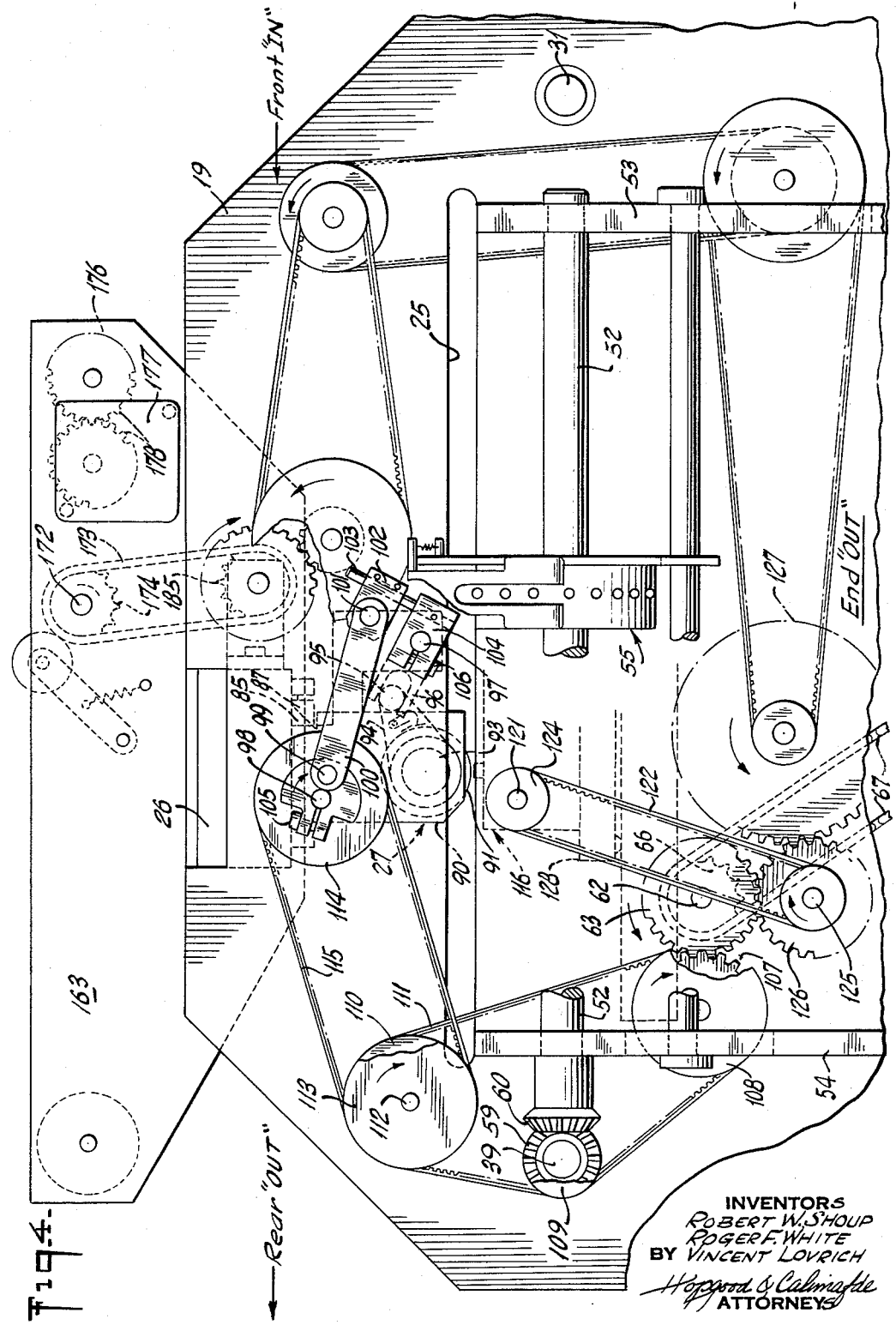

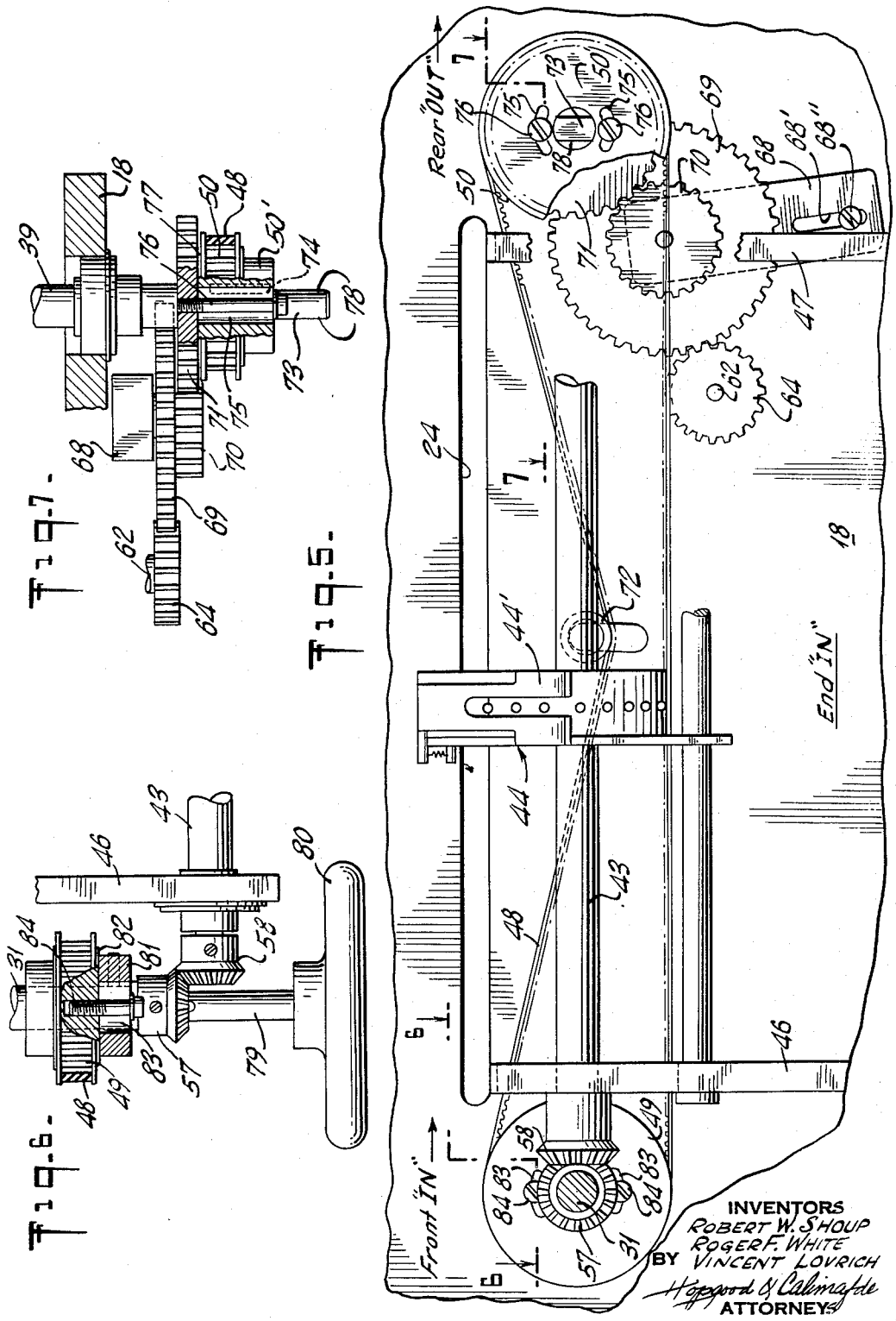

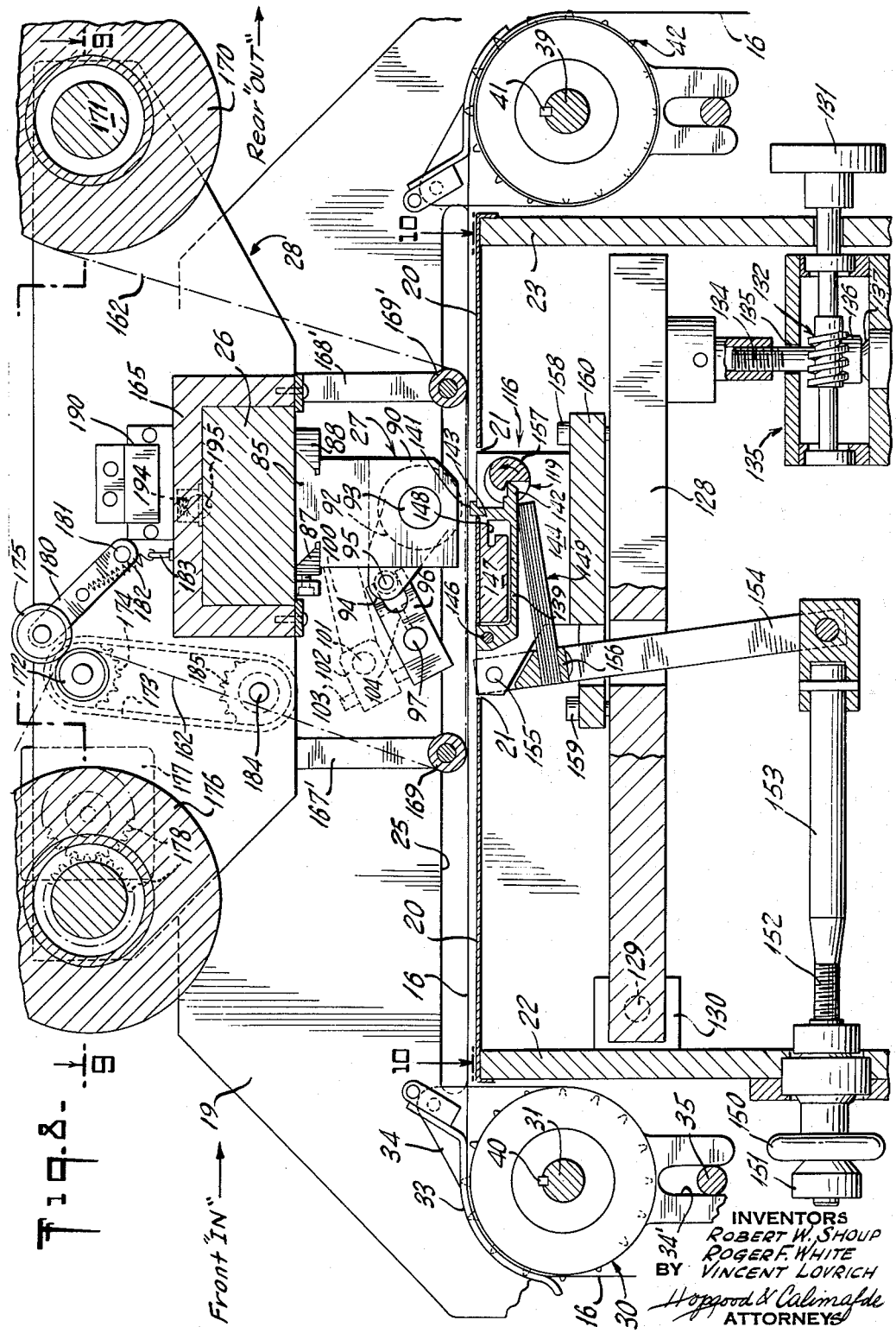

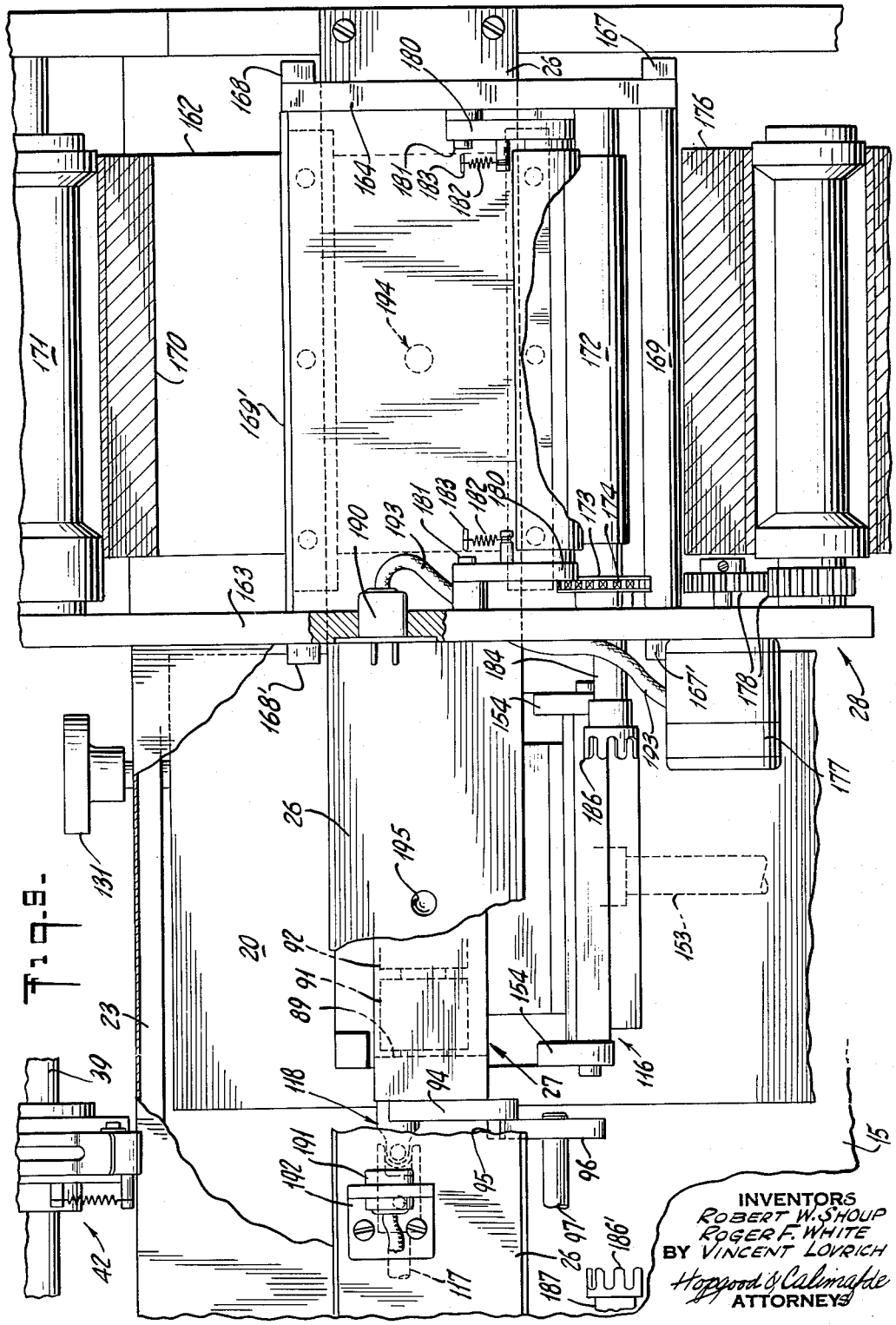

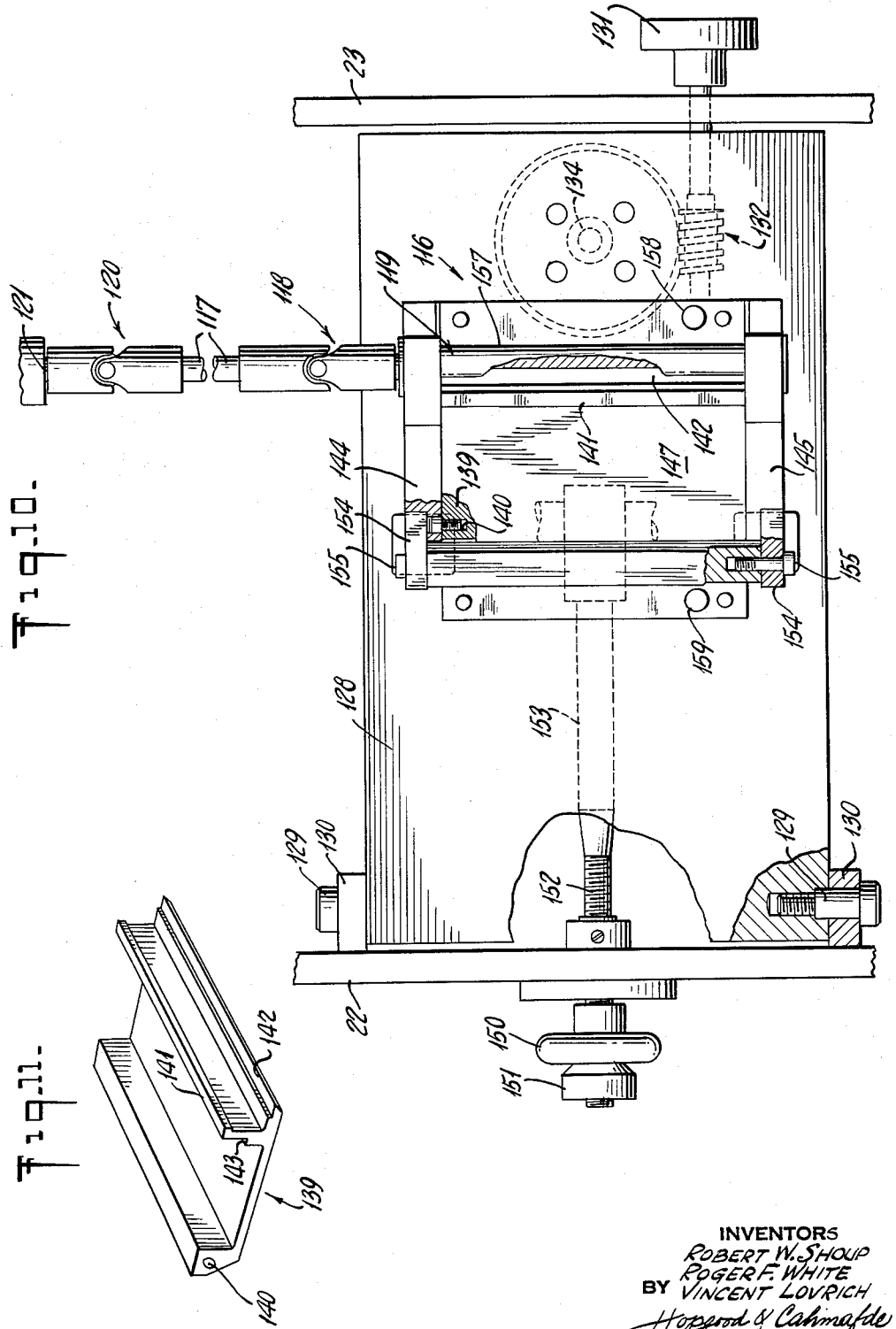

1

3,254,596
DOCUMENT PRINTING DEVICE
Robert W. Shoup, Wyckoff, Roger F. White, Paramus, and Vincent Lovrich, Hackensack, N.J., assignors to Autographic Business Forms, Inc., South Hackensack, N.J., a corporation of New Jersey
Filed May 20, 1964, Ser. No. 368,805
19 Claims. (Cl. 101—102)

Our invention relates to a non-rotary printing machine particularly applicable to recycled precision imprinting of specially characterized information on continuous web, which may be continuously moving through the machine. More specifically, our invention is applicable to printed insertion of limited composition onto base-printed documents, i.e., those which have already been printed with static or master format, as for example letterheads, billheads, greeting cards, bank checks and other commercial papers, as to which documents merely a line or a limited number of lines of further identifying content is to be added for specific localized or personal use.

In today's increasingly automated business world, wherein checks and other business documents must be printed with Magnetic Ink Character Recognition symbols (hereinafter referred to as MICR numbers, as defined in bank-management publication No. 147R [Revised], entitled "The Common Machine Language for Mechanized Check Handling," copyright 1962 by The American Bankers Association) for magnetic identification of serial number, routing symbol, bank code number, branch number, account number and like data, strict registration standards must be adhered to, and yet the demand is for faster production, quicker set-up time, minimum stock (web) waste, and use of less-skilled operators. The demand also exists for machines having MICR-number printing capability not only for single-web thickness but also for multiple-part forms of the snap-out and continuous varieties. Quite aside from MICR-number printing requirements, as noted above, similar needs exist for printing of other limited indicia of more conventional alpha-numeric characters and specialized code and other symbols. Present machines have many limitations accounting for inadequate flexibility and difficulty of set-up, and limitations as to the kind of intelligence that can be printed, particularly in reference to the elongation axis of the web or to the elongation axis of the individual form which is ultimately to be obtained from a given web.

In MICR printing to date, it has been common practice to print magnetic characters on conventional press equipment. This has necessitated modification of the press to meet the exacting standards of magnetic encoding. The procedures followed by the pressman to insure the high quality standards of magnetic printing exceed in time and attention to detail those required by normal printing. Moreover, set up of the conventional press requires plural printing cylinders available in different sizes, depending upon job requirements, availability of "parallel" and "convex" numbering heads appropriate to each particular printing cylinder, and the complexity of set-up involves undue wastage of stock. Thus, the cost to the printer is increased in proportion to the amount of data applied to the document.

It is an object of the invention to provide an improved machine of the character indicated which will meet the above-stated demands and exceed the capabilities of present machines.

A specific object is to provide an improved printing machine having inherent capability, with a single printing head, of printing with equal efficacy, regardless of whether the elongation axis of the intelligence to be printed is aligned with or transverse to the path of web movement, and regardless of ultimate document size.

2

Another specific object is to provide an improved printing machine having inherent capability of printing with MICR numbers, with or without serialized imprinting of Arabic numbers, and with cast type (printing slugs), with or without serialized imprinting of numbers.

A further specific object is to provide an improved printing machine meeting the above objects and having inherent flexible adaptability to printing with magnetic ink or any other desired pigment.

It is a general object to meet the foregoing objects with a machine having simple adjustment features, having inherent capacity to keep type faces clean and free of ink at all times, and having inherent capacity to print clean on fast and continuously moving web material, without distorting or losing the exact intended dimensions of the type font.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is an overall perspective view of a printing machine of the invention, with end covers removed, to reveal synchronizing and adjustment features of web-feed mechanism, the view being taken from the corner between sides labeled "Front-IN";

FIG. 2 is a diagrammatic representation in perspective of most of the drive connections and other rotary actions of the machine of FIG. 1, the view being taken from the corner between sides labeled "End-OUT" and "Front-IN";

FIG. 3 is an overall plan view of the machine of FIG. 1, with the ribbon carriage in printing position;

FIG. 4 is a fragmentary view in end elevation, looking at the side identified "End-OUT";

FIG. 5 is an enlarged fragmentary view in end elevation, to show adjustable features of the web-feed drive at the side identified "End-IN";

FIG. 6 is an enlarged fragmentary plan view of adjustment mechanism, with certain parts broken-away and sectioned along the line 6—6 of FIG. 5;

FIG. 7 is an enlarged fragmentary plan view of further adjustment mechanism, with certain parts broken-away and sectioned along the line 7—7 of FIG. 5;

FIG. 8 is an enlarged vertical sectional view taken in the plane 8—8 of FIG. 3;

FIG. 9 is a plan view similar to FIG. 3 but with the ribbon carriage displaced out of the printing position, certain parts being broken-away and sectioned in the line 9—9 of FIG. 8;

FIG. 10 is an enlarged plan view of the print-hammer drive assembly, revealing drive and adjustment features, certain parts being broken-away and sectioned along the line 10—10 of FIG. 8;

FIG. 11 is an isometric view of the hammer element of the assembly of FIG. 10;

FIG. 12 is an enlarged view in elevation of the print-hammer assembly in relation to a print head which happens to be a selectively available alternative for the print head shown in FIGS. 1, 2, 8 and 9; and FIG. 13 is a sectional view taken in the plane 13—13 of FIG. 12.

Briefly stated, the invention in a preferred form provides web-support in the horizontal plane of a table, across which there is selective availability of web-feeding on either of two orthogonally oriented paths of continuous web movement. Printing is accomplished by reacting a hammer impact against the characterized impression face of a printing head, via the web and a pigmented ribbon. Drive on both web-fed axes is continuous so that drive connections need not be changed (except for possible phase and registration adjustment)

when changing from one to the other web-feed axis, meaning that the axis of the printing or impression face is shifted between selectively available orientation in the direction of web motion or transverse thereto. Various convenience, set-up and adjustment features will be described.

Although the invention will be described in connection with continuous web having provision for sprocket feeding, it will be appreciated that such feeding is illustrative, in that it happens to be the means of synchronizing web placement for precise location of printing impressions. For "unit documents" (e.g. cut sheets, individual forms, or the like), suitable feeding devices (not shown) are employed to continuously deliver each unit document to the printing region for precisely synchronized imprinting. Thus, it will be understood that reference to "web material" herein contemplates continuous feed of continuous web as well as of suitably fed cut or other unit documents.

Referring to FIG. 1 of the drawings, the invention is shown in application to a printing machine based on a frame 15 which is shown as the top deck of a supporting structure which may be at essentially counter height, and which may be supported on casters for mobility in application and use. Because of the indicated flexibility in use of our printing machine, that is in regard to the acceptability of web movement in either of two orthogonal paths of movement, it is convenient for purposes of the present description to arbitrarily assign designations for each of the sides of the machine. Thus, throughout the drawings and in the description, reference is made to the terminology "Front-IN" and "Rear-OUT" to designate movement of web material 16 from the front side of the machine through the central printing area and out the rear end of the machine. In accordance with a feature of the invention, the machine has equal flexibility in accommodating web movement at right angles to this direction, and for this purpose a web shown in phantom at 17 may be accommodated by entering the machine at the side labeled "End-IN," proceeding through the printing region and out the side labeled "End-OUT."

The frame for our printing apparatus is shown to include upstanding side plates 18–19 secured to the base plate 15 and providing journal support for various shafts to be described. Supported between the end plates 18–19 is a table structure or platform 20 over which the web 16 (or 17) is drawn, depending upon the selected direction of web movement. Printing occurs at a central location within the area of table 20, and, at the particular printing location, there is an opening in the table 20 proper. This opening is not viewable in FIG. 1, but it is identified 21 in FIG. 8. The lateral side of the table surface 20 derives further support from upright spacer members 22–23 (see also FIG. 8) extending between the end plates 18–19. Each of the end plates 18–19 extends substantially above the plane of the table surface 20 and, at the level of the table surface 20, is provided with a slotted opening 24 (in the case of end plate 18) and 25 (in the case of end plate 19) through which web 17 may be fed freely, should that direction of web movement be selected. Above the slot location or plane of table 20, the plates 18–19 provide support for an elongated spacer and guide bar 26 for positioning the printing head 27 and for slidably supporting a carriage 28 for the ribbon-support and feed mechanism.

WEB-FEEDING MECHANISM

For the present illustrative embodiment, the machine is assumed to accommodate continuous web material which is provided at its lateral margins with apertures of standard configuration, which may be a series of holes spaced one half inch on centers. For accurate feeding, the feed-roll mechanism therefore embodies sprockets on both the "IN" and "OUT" ends of web travel through the machine, in any particular direction of web movement. Thus, for the web 16 entering the "Front-IN" side of the machine, as shown particularly in FIG. 1, the web 16 passes over sprockets 29–30, adjustably fixed at appropriately spaced locations on a first sprocket driveshaft 31, journaled in the two end plates 18–19. We prefer that the sprockets 29–30 shall be of the so-called disappearing-pin variety, so that tear is avoided upon entry of the pins into particular sprocket holes in the web. To make for positive registration of pins in the sprocket holes, tracking or guide fingers 32–33 are spring-urged with reference to suitable supporting members, as at 34, guided at a forked engagement 34' with a guide rod 35. A rod 36 between bracket arms 37–38 may rock about the axis of rod 35 and by its own weight serves to maintain the web 16 in extensive angular contact with the sprocket-feed elements 29–30, as will be understood.

It will also be understood that at the "Rear-OUT" end of the trajectory for web 16, after having passed the printing location, further web-feeding sprocket means including a further driven shaft 39 (FIG. 8) may draw off the imprinted portion of the web for feeding to a suitable folding, stacking, cutting, collating or other device (also not shown).

The feeding mechanism for web 16 may be said to utilize opposed and spaced web-feeding shafts 31–39 which are provided with keyed engagement, as at 40 for the sprocket assembly 30 at the "IN" side, and at 41 for the sprocket assembly 42 on shaft 39 at the "OUT" side (see FIG. 8). Set screws (not shown) will be understood to secure particular sprocket assemblies in desired position along the length of their respective shafts 31–39, depending upon marginal limitations of the web to be served thereby. Such lateral placement of the sprocket assembly also will be understood to determine where on the total lateral spread of a particular web the printing impression delivered at 27 will be placed.

The web-feeding means has been described in general terms, particularly in reference to selection of the front-to-rear direction of web feeding, as in the case of the web 16 shown in FIG. 1. Mechanism for feeding the web along the orthogonal web-feeding direction, as for the handling of web 17 shown in phantom in FIG. 1, will be understood to be generally the same nature as that described for the web direction running from "Front" to "Rear." Thus, at the "End-IN" side of the machine, a first shaft 43 may adjustably support spaced web-feed sprockets 44–45 equipped with spring guide fingers, the shaft 43 being journaled in spaced upright frame supports 46–47 secured to the table base 15. The uprights 46–47 are shown offset from the vertical plane of the adjacent upstanding end plate 18 in order that a toothed drive belt 48 may connect shafts 31–39 for no-slip rotation, in unison and in the same direction, by way of toothed pulleys 49–50.

The FIG. 1 showing of "IN" feed mechanism for the web 17 also reveals spaced supporting rolls 51 provided in such multiplicity as may be necessary in the region between feed sprockets 44–45 to develop adequate support for smooth guiding of the web from upward to horizontal travel into the printing region. At the other end of the machine, that is, the "OUT" end for the direction handling the web 17, the "OUT"-sprocket feed arrangement may be as described for the assembly on shaft 43. Thus, a shaft 52 journaled in spaced upright frame supports 53–54 may carry spaced web-feed sprocket assemblies 55–56, adjusted for alignment with the assemblies 43–44.

In order that all web-feeding sprocket drives may operate in unison, we show the two "IN"-feeding shafts 31–43 as being directly geared together at bevel-gear connection 57–58 (FIGS. 2–3). A similar bevel-gear connection 59–60 interlocks the "OUT" web-feeding shafts 39–52 for unitary rotation.

Referring particularly to FIG. 2, the basic drive for all of the web-feeding shafts 31–39, and 43–52, is derived from an electric motor 61, rotation of which is imparted to an elongated transmission shaft 62 running from end to end of the machine, between and journaled in the upright frame members 18–19, so as to provide drive output at a spur gear 63 in the "End-OUT" region and at a spur gear 64 at the "End-IN" region. Toothed belt and pulley means 65–66–67 accomplishes drive to shaft 62 from motor 61.

In order that web-feeding speed may be set for the ultimate spacing between printing impressions on a continuously moving web, and at a selected high speed, we provide for change gears, appropriate to the desired feed speed, in the connection between the drive shaft 62 and the drive pulley 50. This structure is best shown in FIG. 5 and comprises an adjustable bracket 68 mounting idler change gears 69–70 of desired relative size. The gear 69 meshes with the spur gear 64, and this rotation is transmitted by gear 70 to a further gear 71 secured in driving relation with the pulley 50 for belt 48. The bracket 68 is provided with an elongated adjustment slot 68′ and bolt means 68″ for anchoring the same to the frame member 18, depending upon the particular change gear employed at 69–70 to suit the web-feed speed requirements. Accurate drive synchronization for pulleys 49–50 is assured by suitable belt-tensioning means at idler roll 72, adjustably carried by the upright frame member 18.

FIRST PHASE ADJUSTMENT

The described connection of drive parts from transmission shaft 62 through the change gears to pulley 50 will also be seen in FIG. 7, which further illustrates an adjustable feature of the invention. The gear at 71 is carried idle on a reduced portion 73 at the end of the shaft 39, and the pulley 50 is keyed at 74 to this reduced part of the shaft 39. The pulley 50 also includes an extended hub 50′, so that the keying reference can be more extensive. Extending through both the hub and pulley 50′–50, are opposed arcuate slots 75, through which clamp bolts 76 pass for anchoring in corresponding parts of the gear 71. A friction element such as a disc or washer of friction material 77 between pulley 50 and gear 71 assures against slip for any given clamped adjustment.

It will be seen that the described limited arcuate movement possible, as between bolts 76 and slots 75, permits adjustment of the relative angular phase of sprocket teeth on shaft 39 with respect to the drive means 64–69–70–71 and that the extent of this adjustment is sufficient to account for a range over the total spacing between any two adjacent sprocket teeth (i.e. aperture spacing on the margin of the web 16). Adjustment is made by slackening the clamp bolts 76 to release the friction engagement at 77. Flats 78 on the reduced end 73 of shaft 39 make possible a spanner engagement while the drive 64–69–70–71 is stationary, and small angular adjustments within the hole-to-hole spacing on the web may thus be made; the adjustment is secured by tightening the bolts 76. A desired phase relation between the drive mechanism and the sprocket teeth on shafts 39 is thus secured, as long as the need for that adjustment exists.

Since the described adjustment accomplishes relative phasing of sprocket teeth on shaft 39 as compared with the instantaneous orientation or angle of the basic drive means 64–69–70–71, we refer to this as a first phasing adjustment in the web-feeding means; this first phasing adjustment thus serves for basic synchronization of web-sprocket hole location at the instant of printing. It will be noted that since the shaft 39 is connected by bevel gears 59–60 to the corresponding shaft 52 for the other orthogonal direction of feed, and since the shaft 43 is similarly connected by bevel gears 57–58 to the corresponding shaft 43 for such orthogonal feed, the described access for first phase adjustment at 76–78 serves whichever one of the web-feed directions may have been selected, thus making for simplicity of set-up of the machine.

SECOND PHASE ADJUSTMENT

In order to adjust the phasing of sprocket teeth on the "IN" or inlet side of the machine for any given direction of feed, with respect to those on the "OUT" or outlet side for the same direction, we show in FIG. 6 a second phase-adjustment means, which permits slight angular adjustment between "IN" and "OUT" web-feed shafts for both directions of possible web feeding. This feature is provided at the end of the shaft 31, which is of reduced section at 79, and extends outwardly of the main works of the machine to provide a handwheel access at 80. If a cover is provided for the works at this end of the machine, then the handwheel may be the one externally accessible part of the mechanism, because it also permits manual manipulation of the entire feed mechanism during set-up. Both bevel gears 57–58 are fixed to their respective shafts 31–43, and the adjustable provision is as between a collar member 81 having a keyed or set-screw relation to the shaft 31, on the one hand, and the pulley 49 on the other hand. Between these two parts, we show a friction washer 82 similar to the friction washer 77 for the other adjustment mechanism. Also, as with the first phase-adjustment mechanism, collar 81 is provided with opposed arcuate slots 83, so that bolts 84 threaded into the hub of pulley 49 may be adjustably angularly placed within the range of slot adjustment at 83. It will be appreciated that, upon slackening of bolts 84, small angular setting adjustments of the two "IN"-feed shafts 31–43 may be made in unison merely by turning the handwheel 80. Having made the desired adjustment (without having moved the belt 48 and thus without having moved the other two shafts 39–52), there has been effected a slight change in relative positioning or phasing of the sprocket teeth on the "IN" ends with respect to those on the "OUT" ends of both directions of web-feeding movement. The adjustment, once made, may be secured by tightening the bolts 84. It will be seen that such adjustment makes possible a desired degree of slack in the web between "IN" and "OUT" web-feeding locations. This slack is necessary to permit the very brief momentary arresting of web travel during the making of a printing impression (in the order of less than 0.001 second). Actually, this arresting of web travel is purely local and does not affect the effectively continuous flight of the web, and the slight degree of slack permits the making of clean impressions without in any way tearing the paper, or distorting or losing the exact intended dimensions of the type font.

THE PRINTING HEAD

As previously noted, the printing head 27 is carried beneath the guide bar 26. In the form shown, the underside of this guide bar is provided with rails or gibs 87–88 (FIG. 8) defining an elongated dove-tail slot, so that the printing head may be adjustably positioned and secured, as each particular job may require. The dove-tail nature of the printing head 27 is best seen at 85 in FIGS. 2 and 8 for one form of printing head, and at 86 in FIG. 13 for another form of printing head.

Referring again to FIG. 2, the particular printing head 27 shown therein is capacitated both for sequential numbering of printing impressions and for MICR-numbering with fixed code symbols. For this purpose, the printing head comprises a main frame having spaced depending arms 89–90 positioning an elongated shaft (not shown) carrying a first plurality of number discs 91, and a second plurality of number discs 92. The only difference between the sets of number discs 91–92 is that the first set (91) includes means whereby the displayed number may be indexed, by one or a selected number of units, for each printing operation, or is related in some other way to the number of printing operations; the second set

(92) remains fixed, for any given job requirement, and may be characterized to meet MICR-numbering standards. In the form shown, an actuating shaft 93 extends outside the support 89, so that a crank arm 94 with offset pin 95 may receive actuating angular reciprocation, for the sequential indexing of numbers in the bank of digits covered by number discs 91. Of course, the second bank of numbers (92) would be actuated (coded) by the operator when setting up the machine, but this is quite aside from the sequential indexing involved in the digits of the bank of numbers 91.

In order that number-indexing may be properly synchronized with other operations of the machine, positive drive and cycling, as to the actuation of arm 94 and its pin 95, are related directly to the main motor 61. In this connection, pin 95 receives its motion from the forked end of an arm 96 at the end of a rocker shaft 97 journaled in the end-frame member 19.

Referring additionally to FIG. 4, basic rotary reciprocating motion for the rocker shaft 97 is derived from an eccentric or crank mechanism on a continuously driven shaft 98 journaled in the end frame member 19. Crank motion from a pin 99 carried by shaft 98 is imparted to a link or rod 100 connected at 101 to a bracket 102, which in turn is adjustably positionable along an arm or rod 103 carried by a hub or bracket 104 on the rocker shaft 97. The parts 101–102–103–104 thus effectively define an arm through which crank motion at 99 is received via link 100 to impart rotary reciprocation to the shaft 97. The throw or angular extent of such reciprocation will be various, depending upon the radial adjustment of the bracket 102 along the arm or rod 103, and the particular phasing of this reciprocation will be dependent upon the angle on shaft 98 at which crank pin 99 is adjustably set, as by tightening the clamp 105; similar phasing adjustment may be made at the clamp 106 which secures bracket 104 to the rocker shaft 97.

Drive to the eccentric or crank mechanism described for shaft 98 and pin 99 is provided by way of gear pick-off at 107 from the transmission gear 63, thence via a toothed-belt and pulley drive 108–109–110, involving the belt 111. It will be noted that the pulley 109 which rides on the shaft 39 is merely an idler pulley and provides nothing but an offsetting reference to avoid interference between the belt 111 and the shaft 39. The described employment of belt 111 establishes continuous rotation at an upper shaft 112 journaled in the end frame 19, and this continuous motion is transmitted by another toothed-belt and pulley drive, employing the pulley 113 on shaft 112, direct via belt 115 to the pulley 114 on shaft 98.

Even though the printing head 27 incorporates many more characters than are ever used in a given impression, it will be understood that for any given impression all exposed characters, that is, the entire relief structure characterized for purposes of printing impression, is flat or presents a flat face, in essentially a single plane. The characters in that face extend longitudinally of the printing head and are essentially flat in a common plane even though more than one line of printing characters may be employed in a given printing impression. The indexing-number feature associated with the crank arm 94 and with the bank of sequential numbering digits 91 is shown purely for illustrative purposes, to indicate that such function may be easily synchronized with other operations of the machine. In many job situations, the desired printing operation will not involve any indexing of number digits; however, the motion of rocker shaft 97, with its output arm 96, is at all times present, in the event indexed numbering is desired.

PRINT-HAMMER MECHANISM

In the particular type of printing employed in the present preferred embodiment, the print characters on the impression face of head 27 are held fixed. The impression face of the printing head 27 is closely adjacent and in facing relation with the plane of the web 16 (or 17), that is, close to the plane of the table surface 20. To make a printing impression, hammer means below the table surface 20 rises for momentary striking impact against the print face, the web and the pigmented ribbon being momentarily squeezed by the impact.

The print-hammer assembly is shown in simplified form in perspective at 116 in FIG. 2, and for present purposes it suffices to state that this hammer mechanism receives its re-cycling synchronized actuation input via a shaft 117 which is continuously rotating and which is shown to have universal-joint connection at 118 to the trip member or cam 119 (FIGS. 8, 10) forming part of the hammer assembly 116. The other end of the shaft 117 has similar universal-joint connection at 120 to a shaft 121 journaled in the end-plate member 19. Continuous drive to the shaft 121 is developed by a toothed belt 122 between pulleys 123–124, with the pulley 123 connected by shaft 125 to a spur gear 126, having pick-off connection to the main transmission gear 63.

The described gear connection for the print-hammer trip mechanism at 119 will be appreciated as being fully synchronized with the rotary reciprocation cycle of the number-indexing mechanism at 94. The phasing of these synchronized operations is such as to assure their being interlaced, so that the hammer trip of the printing function occurs in interlaced relation with the number-indexing function.

The print hammer assembly is best shown by reference to FIGS. 8, 10 and 11 in conjunction with the simplified showing of FIG. 2. This assembly is adjustably elevated on a platform 128 pivoted at 129 to bracket means 130 forming part of the frame, being secured to the frame member 22. A jack mechanism having an external hand wheel or knob 131 operates a worm drive at 132 to a jack screw 134 retained within a suitable housing structure 135. To avoid binding due to angularity in such adjustment, the jack screw 134 is shown to be spherically concave at its base or head 136 for smooth, universal, angularly-free, sliding contact over a spherical head 137 held in the housing structure 135. Clearance at 138 will be appreciated as permitting the slight angular movement involved in adjusted elevation of table 128.

In accordance with a feature of the invention, the print hammer itself is a unitary elongated structure simultaneously bridging and serving a plurality of characters on the impression face of the printhead. Actually, the hammer structure may be sufficiently elongated to serve all characters in one line or in several lines, depending upon the makeup or composition of the characterized relief on the impression face of the printinghead 27. Thus, the hammer may be as shown in FIG. 11 at 139 and having an elongated pivot axis 140 oriented parallel to the printing plane and to the elongation axis of the printinghead. The print hammer is generally channel-shaped and is provided with an elongated anvil face 141 offset from the axis 140 and so characterized as to present a flat elongated surface which may mate continuously and simultaneously with all characters on the impression face of the printinghead.

Outwardly projecting from the radius of the anvil face 141 is a sharp edge or lip 142 which serves for trip purposes, and the base of the anvil 141 is provided with an elongated ledge 143 which serves as a stop, reacting against a frame part of the machine in order to avoid over-impacting of the printinghead. The pinned connection of the hammer between spaced supporting plates 144–145 is shown at 146 (see FIG. 8). A bridge or stop 147 spaces the plates 144–145 and is received within the recess or channel of the print hammer 139 and in clearance relation thereto; this is true except for a projecting stop or lip 148 positioned to intercept the stop ledge 143 and thus to define an upper limiting position for the print hammer 139.

Spring means in the form of plural elongated spring leaves, stacked to operate in unison, are shown at 149 for preloading the print hammer 139 continuously in the direction of the stop engagement 143–148. The extent of this preload is determined by an adjustable mechanism externally accessible for control at a hand knob 150, with provision at nut 151 for locking the same in any given adjustment. Knob 150 operates a jack screw 152 for advancing or retracting a rod 153 right or left (in the sense of FIG. 8), thus operating a crank arm 154 about its pivot 155 in the print-hammer frame 144–145. The arm 154 carries suitable clamp means 156 securing the spring assembly 149 in place.

Recycled printing trips of the hammer 139 are governed by the previously described rotation of cam-shaft 119, in the direction of the arrow shown in FIG. 8. This shaft 119 includes a cam 157 shown at an instant just prior to intercepting the lip 142 of the print hammer 139. Further angular movement beyond this point "lifts" the lip 142 to a progressively downward position, thus retracting the anvil 141 away from the printing plane and against the resilient action of spring means 149. When fully cammed to striking position, the lip 142 abruptly rides off of the cam 157 and is instantly driven by the strong compression force of spring 149 into momentary printing impact, as limited by the stop at 143–148. The exact relation of the anvil face at 141 and the impression plane of the printing head 27 will of course depend upon the total thickness of web material (e.g. single-ply versus multiple-ply) and is achieved by suitable adjustment means at 158–159 whereby the base 160 of the hammer framework proper may be given small adjustment with reference to the elevation of the table 128. This is an adjustment operation which need not be changed once the machine has been set up.

RIBBON MECHANISM

The ribbon-supporting assembly 28 has been described generally as featuring provision for lateral shifting along the guide 26 in order to provide access to the printing head 27 or to facilitate loading of ribbon 162 in the ribbon assembly, the ribbon base may be paper or cloth, or it may comprise a plastic base, as of mylar, with a suitable pigmented coating, as of magnetic ink. The ribbon assembly as shown (FIGS. 1, 3, 4, 8, and 9) comprises a frame defined by upstanding side plates 163–164 connected at 165 by channel means having close-fitting guided relation with the cross-sectional contour of the supporting guide bar 26; gib plates 165' serve to retain this guided relation. Off-set legs or bars 167–167'–168' serve to position the pivot axes for idler rollers 169–170 adjacent the plane of the web 16 in the region of printing, and to hold the ribbon 162 taut in said plane for optimum transfer of pigment to the continuously moving web 16. A take-up reel 176 accumulates used ribbon.

Fresh pigmented ribbon 162 may be available from a supply reel 170 removably carried on a cantilevered stud 171 mounted on the frame plate 163. The ribbon 162 is of a width, extending across the elongation axis of the impression face of the printing head 27, and, depending on the job requirements, its width may register with the full length of the print-hammer anvil 141.

In order that the amount of ribbon may be accurately metered in synchronism with the other described operations of the printing machine (without waste of pigment between successive impressions), its basic drive is derived from a drive roll 172 journaled in the space frame members 163–164 and driven by chain 173 and sprocket 174 from the previously described basic continuous drive of the machine. The particular train of driving connection to continuously operate the feed roll 172 will be later described.

In order that there shall be no slip in the steady, synchronized advance of the ribbon 162, an idler pressure roll 175 rides over the ribbon as it is paid out by the feed roll 172, this idler roll 175 is shown carried at the end of an arm or yoke structure 180 having pivotal connection at 181 to both frame plates 163–164, and spring means 182, referenced to the frame at 183, provides the means of resiliently loading ribbon 162 against the roll 175. For set-up purposes, when threading ribbon 162 into the structure 28 the pressure roll 175 may be lifted so that the spring action at 182 passes the dead-center relation with pivot 181 and it may be then held by spring 182 out of contact with the feed roll 172.

In order that the take-up reel 176 may be driven at correct speed regardless of the extent of accumulated ribbon, we show independent drive thereto via a stalled-torque device which may be a suitably rated electric motor 177 carried by the frame plate 163 and driving the take-up reel 176 via suitable gearing 178.

To complete the description of parts carried by the driven assembly, the continuous drive for the take-up reel or spindle 172 is derived from a shaft 184 journaled in the plate 163 and carrying a drive sprocket 185 meshing with the chain 173 already identified. This drive connection must be severed when the ribbon-supporting assembly 28 is removed from its printing position by sliding along the guide bar 26. Therefore the shaft 184 is provided with a dog-clutch member 186 mating with a suitably cooperating dog-clutch member 186' on a continuously running drive shaft 187; shaft 187 is journaled in the upstanding frame plate 19, and it receives its continuous drive from gear pick-off at 127 from the main motor, as translated by toothed-belt connections 166–166'–166'', to a pulley driving a gear train connection 187' to the shaft 187. The parts 186'–187 thus remain axially fixed when the assembly 28 is shifted away from printing position, and only when returned to printing position as shown in FIG. 3, is the dog-clutch connection established at 186–186' so that continuous drive may be imparted to the ribbon-feed mechanism.

It is a further feature of the invention that electrical connection to the stalled-torque drive 177–178 be disconnected, severed or interrupted when the assembly 28 is removed from printing position. In the form shown, this is accomplished by plug-and-receptacle fittings which are severed when out of printing position. The plug element of such a structure is identified at 190 in FIG. 9 as being carried by the frame plate 163, with the plug elements extending parallel to the axis of guided movement for the ribbon assembly 28. The mating receptacle part 191 is shown fixedly mounted on a bracket 192 secured to the guide bar 26, and the flexible-cable connections to these described plug and receptacle parts are as necessary to achieve the desired purposes, the cable 193 being shown passing through the frame plate 163 to the motor 177. A ball-detent mechanism 194 carried centrally of the channel 165 coacts with a suitable socket recess 195 in the guide bar 26 to resiliently retain the ribbon carriage in printing position, with feed connections 186–186' and 190–191 properly established throughout a printing run; in the position displaced from printing position, the detent mechanism 194 drags and therefore tends to hold this offset position of the ribbon carriage.

ALTERNATIVE PRINTING HEAD

It has been indicated certain jobs may not require the sequential or MICR-numbering described in connection with the printing head 27, and that on the other hand the intelligence to be printed is in the form of a cast printing slug. A head assembly for such situations is shown and will be described in connection with FIGS. 12 and 13.

The printing head of FIGS. 12 and 13 is an articulated assembly of a movable slug clamp 200 and a fixed base 201, having the dovetail 86 for secure mounting on guide bar 26. The base 201 includes depending arms 202–203 to which the clamp assembly 200 is pivotally connected by pin 204. A spring-detent pin 205 is carried by arm 202 and projects into a locating hole 206 to hold the clamp unit 200 in printing position, shown in solid outline in FIG. 12 and in phantom outline in FIG. 13. Detent pin 205 includes an external knob 207 to permit pivoted removal of clamp unit 200 from printing position, being swung about 45 degrees (counterclockwise, in the sense of FIG. 13). In this swung or retracted position, pin 205 intercepts the side of clamp 200 to hold the position, until released by pulling knob 207.

The clamp unit 200 is an elongated vise, comprising spaced arms 208–209 between which the printing slug 210 is received. Knobs 211 operate vise screws, as at 212, threaded in arm 209 and bearing against an elongated pressure bar 213, the slug 210 being squeezed and firmly held between bar 213 and arm 208, while bottoming firmly at 214 on the body of clamp 200.

In printing position, the impression face 210' of slug 210 will be seen to be firmly located in face-to-face registration with the anvil 141 of the print hammer, and the clamp body 200, being swung into vertical orientation, establishes at its base-contact surface 215 extensive area of firm referencing contact with the corresponding surface 216 of the fixed base 201. This relation assures positive referencing, for repeated high-quality, clean printing impressions, no matter how extended the printing run. When it becomes necessary to change printing slug 210, as for the next job run on the same loaded stock (web), clamp 200 need only be swung out of printing position by operating knob 207. Clamp knobs 211 are easily slackened, to release slug 210, for replacement. After resetting knobs 211 against the newly inserted slug 210, actuation of knob 207 drops the clamped slug into printing position, for positive retention throughout the run.

Although the alternative printing head of FIGS. 12 and 13 has been described in conjunction with selective insertion of printing slugs such as the slug 210, it will be understood that this is but an illustrative use of such alternative printing head mechanism. Other forms of precomposed type, as for example Addressograph plates, electrotypes, photo-engravings, and the like may be insertably received and positoned by the alternative printing head in place of the slug 210, as long as the printing face is positioned and securely held in the impression plane already described for the printing head.

CONCLUSION

It will be seen that we have described an inherently simple but substantially improved printing machine, characterized by features which make for more universal application to a wider variety of job requirements and for fast set-up for different jobs. Of particular importance is the availability of alternate orthoganol web feeds (which incidentally may be operated forward or reverse, as desired, merely by suitably energizing the motor 61), and the simple phase-adjustments which serve both orthogonal feed directions. The print-hammer mechanism is the essence of simplicity and is found to produce clean impressions, at high production rates, whether the job requires the printing of a single character or multiple lines of type. Printing impressions are of uniformly high quality, meeting the exacting MICR-numbering standards, for production as high as 360 impressions per minute, on 3-inch spacings (i.e. the web being a succession of forms of three inch ultimate width). Print-head numbering or slug changes are readily made, without disturbing the ribbon mechansm, the latter being simply shifted out of printing position.

Our equipment may be used on an "off-line" basis or as a synchronized part of a collating machine; in the event of synchronism with a collating machine, the presently described printing machine may be driven by the basic drive of the collating machine, as by sprocket connection (not shown) to the motor shaft 61' (see FIG. 2), in which event the motor 61 would not be electrically excited. Unlike the prior equipment, our machine requires no special skills on the part of the operator and is, in fact, completely universal as to form size and as to the direction of the imprint line, in relation to the direction of the continuous web. With only a simple change of gears, it is possible to print in MICR or conventional characters any common-size document either as a single ply or as multiple plies.

While we have described the invention in detail for the preferred form illustrated, it will be understood that modifications may be made without departing from the scope of the invention as defined in the claims which follow:

We claim:

1. In a printing machine, a frame including a printing head including means for positioning in essentially a single plane an elongated characterized relief to be cyclically printed at spaced locations on a moving web, means for holding said plane of said head in relatively fixed relation to said frame during a printing operation, means for supporting and feeding pigmented ribbon substantially in said plane and across the characterized relief, first web-feeding means carried by said frame and including means for supporting and feeding web material in close facing adjacency to the relief plane and in essentially a first of two orthogonal directions, sceond web-feeding means carried by said frame and including means for supporting and feeding web material in like close facing adjacency to the relief plane but in essentially the second of said orthogonal directions, continuous drive means associated in common with both said first and second web-feeding means, whereby, without positioning adjustment of said head, the orthogonal direction of web-feeding is selectively available with respect to the elongation axis of the characterized relief, both said web-feeding means including adjustable means for establishing and maintaining a predetermined degree of slack in the web in the location of its passing said characterized relief, and printing-hammer means carried by said frame in facing registration with the characterized relief and including a synchronizing connection to said continuous drive means.

2. In a printing machine, a frame including a table portion establishing a plane of web support and of print-impression transfer, first web-feeding means carried by said frame and including means for feeding web material over said table portion in essentially a first of two orthogonal directions, second web-feeding means carried by said frame and including means for feeding web material over said table portion in essentially the second of said orthogonal directions, continuous drive means associated in common with both said first and second web-feeding means, both said web-feeding means including adjustable means for establishing and maintaining a predetermined degree of slack in the web at the location of print-impression transfer, a printing head carried by said frame and having an impression face on one side of and in facing relation with said plane, means for supporting and feeding pigmented ribbon across said face and adjacent said plane, printing-hammer means carried by said frame on the opposite side of said plane and in facing registration with the impression face of said head, and a synchronized connection between said drive means and said hammer means.

3. A machine according to claim 2, in which each of said web-feeding means includes in-feed roll means and out-feed roll means spaced from each other on opposite sides of said printing head and hammer means, said adjustable means providing a phase adjustment in the synchronized drive of in-and out-feed roll means with respect to each other.

4. A machine according to claim 3, in which said drive means is continuously connected to the in-feed roll means and to the out-feed roll means of both said web-feeding means.

5. In a printing machine, a frame including a rectangular table portion establishing a plane of web support and having a central opening at a location of print-impression transfer, first web-feeding means carried by said frame and comprising a first two-spaced rotary web-engaging sprockets located at a first two opposed edges of said table portion and disposed for feeding engagement with apertured web material on a first path of web movement spanning the opening, second web-feeding means carried by said frame and comprising a second two spaced rotary web-engaging sprockets located at the other two opposed edges of said table portion and disposed for feeding engagement with apertured web material on an orthogonal path of web movement spanning the opening, drive means continuously connected in common to all said sprockets and continuously driving the same in unison, phase-adjustment means effective between the two spaced sprockets of said first web-feeding means and effective between the two spaced sprockets of said second web-feeding means, whereby a predetermined degree of slack may be established in the web at the location of print-impression transfer, a printing head and a printing hammer carried by said frame in mutually facing relation above and below said table portion at the opening thereof, and means connecting said hammer for cyclic operation by said drive means.

6. In a printing machine, a frame including a table portion establishing a plane of web support and of print-impression transfer, first web-feeding means carried by said frame and including means for feeding web material over said table portion in essentially a first of two orthogonal directions, second web-feeding means carried by said frame and including means for feeding web material over said table portion in essentially the second of said orthogonal directions, drive means associated with both said first and second web-feeding means, an elongated guide structure carried by said frame parallel to and above said plane, a printing head secured to and beneath said guide structure and having an impression face adjacent to and facing said plane, a ribbon-supporting carriage slidably guided by said guide structure and comprising means for supporting and feeding pigmented ribbon across said face and adjacent said plane, the ribbon-feed direction being transverse to the axis of guided movement of said carriage, said guide structure being sufficiently elongated to permit selective guided placement of said carriage either in a printing position in which the ribbon is in register with said impression face or in a non-printing position in whch said carriage and the ribbon carried thereby are removed from the printing head for independent access either direct to the printing head alone or to the ribbon carriage alone.

7. A machine according to claim 6, in which said carriage includes ribbon-feed means, and in which there is a drive connection from said drive means to said ribbon-feed means.

8. A machine according to claim 7, in which said drive connection includes disengageable elements having an engaged relation when said carriage is in printing position and having a disengaged relation when said carriage is moved from said printing position.

9. A machine according to claim 7, in which said ribbon-feed means includes electrically operated stalled-torque ribbon-tensioning means, and electric supply means to said electrically operated tensioning means including circuit-disconnect means responsive to cut off electric supply to said tensioning means upon movement of said carriage away from printing position and to complete the electric supply connection when said carriage is in said printing position.

10. A machine according to claim 6, and including detent means coacting between said carriage and said guide structure for detent-retention of said carriage in said printing position.

11. In a printing machine, a frame including a table portion establishing a plane of web support and of print-impression transfer, first web-feeding means carried by said frame and including means for feeding web material over said table portion in essentially a first of two orthogonal directions, second web-feeding means carried by said frame and including means for feeding web material over said table portion in essentially the second of said orthogonal directions, drive means associated with both said first and second web-feeding means, a printing head carried by said frame and having an elongated impression face on one side of and in facing relation with said plane, means for supporting and feeding pigmented ribbon across said face and adjacent said plane, printing-hammer means carried by said frame on the opposite side of said plane and in facing registration with the impression face of said head; said printing-hammer means comprising a hammer member pivotally supported by said frame on an axis parallel to said plane and to the elongation axis of said impression face, said hammer member including an elongated flat anvil portion offset from and parallel to the hammer-pivot axis, the flat anvil portion being in opposed facing registration with a characterized part of said impression face, frame referenced stop means limiting hammer approach to said plane, frame referenced spring means resiliently loading said hammer member toward said stop means, and recycling trip means having a drive connection to said drive means and lifting said hammer member against resilient reaction of said spring member prior to release for spring-driven printing impact against said impression face.

12. A machine according to claim 11, in which the frame support for the pivotal connection to said hammer member comprises adjustable elevation mechanism for adjustably elevating the hammer pivot axis with reference to said plane.

13. A machine according to claim 11, in which the frame-reference of said spring means is adjustable, whereby spring loading of said hammer member is selectable.

14. In a printing machine, a frame including a table portion establishing a plane of web support and of print-impression transfer, first web-feeding means carried by said frame and including means for feeding web material over said table portion in essentially a first of two orthogonal directions, second web-feeding means carried by said frame and including means for feeding web material over said table portion in essentially the second of said orthogonal directions, continuous drive means associated with both said first and second web-feeding means, adjustable means associated with both said web-feeding means for establishing and maintaining a predetermined degree of slack in the web at the location of print-impression transfer, a printing head carried by said frame and having an elongated characterized impression face on one side of and in facing relation with said plane, said head including indexible-character means presenting a different character at a part of said impression face for each of a given cyclical succession of indexed positions thereof, means for supporting and feeding pigmented ribbon across said face and adjacent said plane, printing-hammer means carried by said frame on the opposite side of said frame and in facing registration with the impression face of said head, and synchronized drive connections from said drive means to both said hammer means and said indexible-character means, the nature of such synchronization being such as to interlace hammer operation with character-indexing of said indexible-character means.

15. In a printing machine, a frame including a table portion establishing a plane of web support and of print-impression transfer, first web-feeding means carried by said frame and including means for feeding web material over said table portion in essentially a first of two orthogonal directions, second web-feeding means carried by said frame and including means for feeding web material over said table portion in essentially the second of said orthogonal directions, drive means associated with both said first and second web-feeding means, an elongated guide structure carried by said frame parallel to and above said plane, a printing head assembly including a base secured to and beneath said guide structure, a slug clamp pivotally suspended from said base on a pivot axis parallel to said plane, said clamp being adapted to removably hold an inserted elongated printing slug and to position the elongated impression face thereof along an alignment parallel to said pivot axis, said clamp having a first pivoted position wherein said impression face is adjacent to and facing said plane and having a second pivoted position wherein upon clamp release an inserted printing slug may be removed and replaced, a ribbon-supporting carriage slidably guided by said guide structure and comprising means for supporting and feeding pigmented ribbon across said face and adjacent said plane, the ribbon-feed direction being transverse to the axis of guided movement of said carriage, said guide structure being sufficiently elongated to permit selective guided placement of said carriage either in a printing position in which the ribbon is in register with said impression face or in a non-printing position in which said carriage and the ribbon carried thereby are removed from the printing head for independent access either direct to the printing head alone or to the ribbon carriage alone.

16. A machine according to claim 15, and including detent means reacting between said base and clamp and offset from the pivot axis for detent-retention in a selected one of said pivoted positions.

17. In a printing machine, a frame including a table portion establishing a plane of web support and of print-impression transfer, web-feeding means carried by said frame and including means for feeding web material over said table portion in a web-feeding direction, continuous drive means associated with said web-feeding means, said web-feeding means including adjustable means for establishing and maintaining a predetermined degree of slack in the web at the location of print-impression transfer, a printing head carried by said frame and having an elongated impression face on one side of and in facing relation with said plane, means for supporting pigmented ribbon across said face and adjacent said plane, printing-hammer means carried by said frame on the opposite side of said plane and in facing registration with the impression face of said head; said printing-hammer means comprising a hammer member pivotally supported by said frame on an axis parallel to said plane and to the elongation axis of said impression face, said hammer member including an elongated flat anvil portion offset from and parallel to the hammer-pivot axis, the flat anvil portion being in opposed facing registration with a characterized part of said impression face, frame-reference spring means resiliently loading said hammer member toward said plane, and recycling trip means having a drive connection to said drive means and lifting said hammer member against resilient reaction of said spring member prior to release for spring-driven printing impact against said impression face.

18. In a printing machine, a frame including a rectangular table portion establishing a plane of web support and having a central opening at a location of print-impression transfer, first web-feeding means carried by said frame and comprising a first two spaced rotary web-engaging sprockets located at a first two opposed edges of said table portion and disposed for feeding engagement with apertured web material on a first path of web movement spanning the opening, second web-feeding means carried by said frame and comprising a second two spaced rotary-web-engaging sprockets located at the other two opposed edges of said table portion and disposed for feeding engagement with apertured web material on an orthogonal path of web movement spanning the opening, drive means continuously connected in common to all said sprockets and driving the same in unison, a printing head and a printing hammer carried by said frame in mutually facing relation above and below said table portion at the opening thereof, and means connecting said hammer for cyclic operation by said drive means, each said web-feeding means including spaced elongated shafts journaled in said frame and supporting said sprockets, a first geared connection between a first adjacent two of said shafts, a second geared connection between the other adjacent two of said shafts, and an angularly adjustably secured geared connection between one of the first two and one of the other two shafts, whereby whatever the selected web-feed means for feeding given web material, said adjustment may suitably phase in-feed sprocket engagement to the web in relation to out-feed sprocket engagement therewith.

19. In a printing machine, a frame including a rectangular table portion establishing a plane of web support and having a central opening at a location of print-impression transfer, first web-feeding means carried by said frame and comprising a first two spaced rotary web-engaging sprockets located at a first two opposed edges of said table portion and disposed for feeding engagement with apertured web material on a first path of web movement spanning the opening, second web-feeding means carried by said frame and comprising a second two spaced rotary web-engaging sprockets located at the other two opposed edges of said table portion and disposed for feeding engagement with apertured web material on an orthogonal path of web movement spanning the opening, drive means continuously connected in common to all said sprockets and driving the same in unison, a printing head and a printing hammer carried by said frame in mutually facing relation above and below said table portion at the opening thereof, and means connecting said hammer for cyclic operation by said drive means, each said web-feeding means including spaced elongated shafts journaled in said frame and supporting said sprockets, geared interconnections between all said shafts so that they rotate in unison, a common connection of said drive means to said web-feeding means including a drive member to one of said shafts, and means for adjustably angularly securing said drive member with respect to said one shaft, whereby by operation of said last-defined means the synchronized phasing of hammer operation and web-feeding may be adjusted regardless of the selected web-feed direction.

References Cited by the Examiner

UNITED STATES PATENTS

| | | | |
|---|---|---|---|
| 2,650,090 | 8/1953 | Davidson et al. | 226—79 X |
| 2,911,905 | 11/1959 | Marvin et al. | 101—93 |
| 2,921,515 | 1/1960 | Weingart | 101—68 |
| 2,928,707 | 3/1960 | Grimm | 101—90 X |

DAVID KLEIN, *Primary Examiner.*

ROBERT E. PULFREY, *Examiner.*

NATHANIEL A. HUMPHRIES, *Assistant Examiner.*